Figure 1:
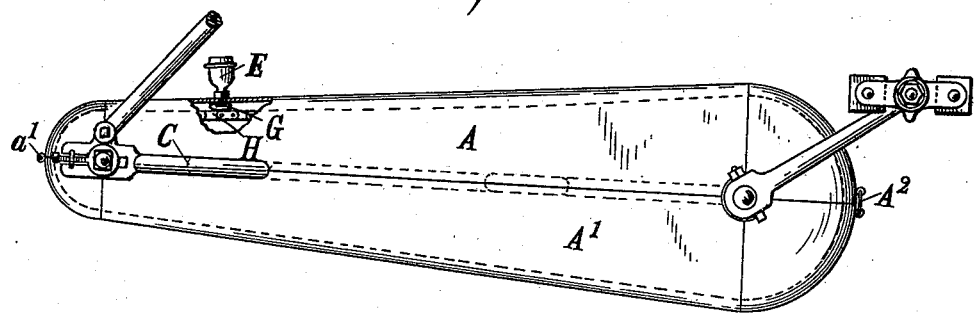

(No Model.)

S. H. PERCY.
GEAR CASE.

No. 501,626.  Patented July 18, 1893.

Witnesses.
Frank Miller
B. V. Woolley.

Inventor.
Sidney H. Percy
By King & Thurston
his attorneys

UNITED STATES PATENT OFFICE.

SIDNEY [B.] PERCY, OF CHICAGO, ILLINOIS.

GEAR-CASE.

SPECIFICATION forming part of Letters Patent No. 501,626, dated July 18, 1893.

Application [filed] February 20, 1893. Serial No. 463,041. (No model.)

*To all whom it may concern:*

Be it known that I, SIDNEY [B.] PERCY, a subject of the Queen of Great B[ritain], residing at Chicago, in the county of [Coo]k and State of Illinois, have invented certa[in] new and useful Improvements in Gear-Case[s], and I do hereby declare the following to be a [f]ull, clear, and exact description of the invent[ion], such as will enable others skilled in the art [to] which it appertains to make and use the [sa]me.

My invention relates to the [cla]ss of devices intended to protect the driv[ing] mechanism of a safety bicycle from dus[t a]nd dirt, and to prevent contact between sai[d d]riving mechanism and the rider's clothes; [an]d it consists in the construction and combi[na]tion of parts shown in the drawings, and [he]reinafter described and pointed out de[fin]itely in the claims.

Figure 2:
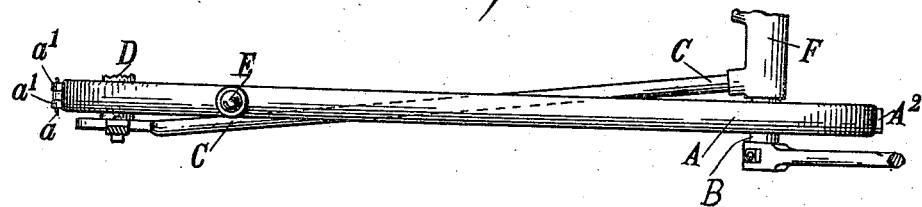
Figure 3:
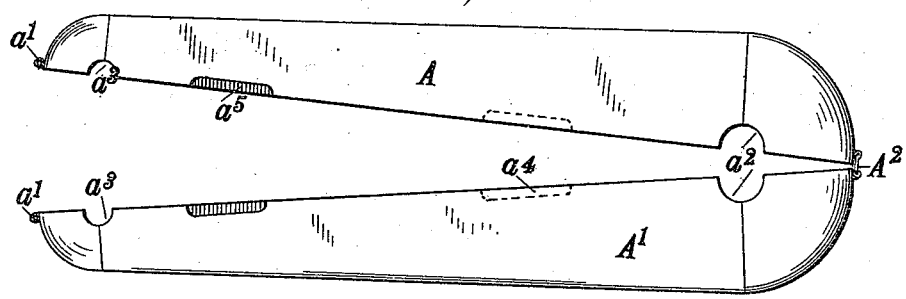
Figure 4:
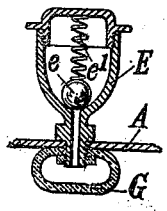

In the drawings, Figure 1 i[s] a side elevation of my improved gear cas[e a]nd a part of the bicycle with which it is u[se]d. Fig. 2 is a plan view of the same par[t.] Fig. 3 is a side view of the gear case ope[ned] and disconnected from the bicycle; and [Fi]g. 4 is a central vertical sectional view of [th]e device for automatically oiling the chain [w]hile the same is inclosed by the case.

The case is preferably made [of] sheet metal, and it is of such shape that it [is] adapted to embrace the two sprocket w[he]els and the driving chain of the bicycle[.] The case is formed of two substantially [eq]ual sections, viz., the upper section A, and [th]e lower section A', which are hinged toge[th]er at one end, preferably by means of the li[nk] A². At the other end of the sections me[an]s, as for example the eyes $a'$ $a''$ and the [pi]n $a$, are provided for connecting or disco[nn]ecting at will the two sections. Near one e[nd] of both sections, semi-circular notches $a$ [a]re formed in the meeting edges. When t[he] sections are closed together; the crank [sh]aft B passes through the opening thus form[e]d in the sides of the case. Near the other e[n]d of both sections similar notches $a^3$ are ma[d]e, which form the opening through which th[e] driving wheel hub enters one side of the cas[e] and the spindle D passes out of the other [s]ide. One of the rear fork members C, is connected at its rear end with the outer end of the spindle D, and at its forward end with the crank bracket F. It therefore passes diagonally through the case, and the meeting edges of the case sections are notched at $a^4$ and $a^5$ to permit it to so pass. The notches $a^4$ $a^5$ are of such depth that when the case is closed, it fits closely against the fork member C. The case thus rests upon, and is supported by, the fork member in the proper relation to the driving mechanism.

It is very desirable to have some means by which the chain may be oiled without removing the case. I therefore secure to the upper edge of the section A an oil cup E, which is adapted to discharge into the case. Supported in the case just below the discharge orifice of the oil cup, is a piece of wicking G, which rests upon the upper side of the chain H. The oil drops from the oil cup onto the wicking, from which it is delivered to the chain. The cup is provided with an automatically operating valve, whereby a limited quantity of oil is delivered to the wicking when the bicycle is in use. In the cup is a ball $e$, which is adapted to close the discharge orifice. A light coil spring $e'$ is secured to the cover of the cup, and when the cover is in place, the lower end of the spring engages with the ball and presses it to its seat. But when the bicycle is being ridden, the vibration will jar the ball slightly from its seat, and thus sufficient oil will be permitted to escape for the intended purpose.

Having described my invention, I claim—

1. In a bicycle, the combination of a gear-case adapted to inclose the two sprocket wheels and the driving chain, with one of the rear fork members which passes diagonally through said case, and suitable means for clamping said fork member on both sides of the case, whereby the latter is supported, substantially as specified.

2. In a bicycle, a gear case adapted to inclose the two sprocket wheels and driving chain, composed of two substantially equal longitudinal sections which are hinged together at one end, the meeting edges of said sections being notched substantially as described, to permit the crank shaft and the rear wheel hub and spindle, and one of the rear fork members to pass through the case when the same is closed, combined with said rear fork member, which passes diagonally through the case and upon which the case rests, and means for securing together the free ends of the case sections, substantially as set forth.

In testimony whereof I affix my signature in presence of two witnesses.

SIDNEY H. PERCY.

Witnesses:
JAMES BAILEY,
P. E. GREGORY.